United States Patent [19]

Peters

[11] 4,252,145
[45] Feb. 24, 1981

[54] MANUALLY RESET CONTROL VALVE FOR A FLUID ACTUATOR

[75] Inventor: Clifford M. Peters, Longview, Tex.

[73] Assignee: W-K-M Wellhead Systems, Inc., Shreveport, La.

[21] Appl. No.: 20,604

[22] Filed: Mar. 15, 1979

[51] Int. Cl.³ .............................................. F16K 17/00
[52] U.S. Cl. ............................... 137/458; 137/624.27; 137/625.66; 137/625.68
[58] Field of Search ....................... 137/625.66, 596.18, 137/624.27, 625.68, 458; 251/63.4

[56] References Cited

U.S. PATENT DOCUMENTS

| 3,874,415 | 4/1975 | Pierce | 137/625.66 |
|---|---|---|---|
| 3,943,974 | 3/1976 | Connelly | 137/624.27 |
| 3,977,438 | 8/1976 | Muchow | 137/625.66 |
| 4,026,326 | 5/1977 | Wells | 137/625.66 |
| 4,034,613 | 4/1978 | Peters | 137/625.66 X |
| 4,073,466 | 2/1978 | Snyder | 137/625.66 X |
| 4,137,942 | 2/1979 | Hargraves | 137/624.27 X |

*Primary Examiner*—Harold W. Weakley
*Attorney, Agent, or Firm*—EugeneN. Riddle; Stephen T. Belsheim

[57] ABSTRACT

A manually reset control valve (28) to control the flow of fluid to a fluid actuator (22) in a safety system for closing a valve in a main flowline (10) upon the reaching of predetermined high and low pressures in the main flowline. The control valve includes an elongate housing having a supply port (26) and a bleed port (124) for the actuator, and a sensing port (34) for monitoring the fluid pressure in the main flowline. The valving in the bore of the housing includes a pressure sensing valve mechanism (42) and a control fluid valve mechanism (44). Pressure sensing valve mechanism (42) includes a high pressure spring (94) responsive to a predetermined high pressure in the flowline to actuate the valving and a low pressure spring (58) responsive to a predetermined low fluid pressure in the flowline to actuate the valving for bleeding the actuator. The control fluid valve mechanism (44) includes a piston (110) movable between supply and vent positions in response to the actuation of the sensing valve mechanism (42). A manual gripping knob (108) on an outer end of the control fluid valve mechanism (44) is pushed for resetting the valving after actuation and a lost motion connection between the pressure sensing valve mechanism (42) and the control fluid valve mechanism (44) permits valve mechanism (44) to be pushed in and reset with a minimum of force.

10 Claims, 8 Drawing Figures

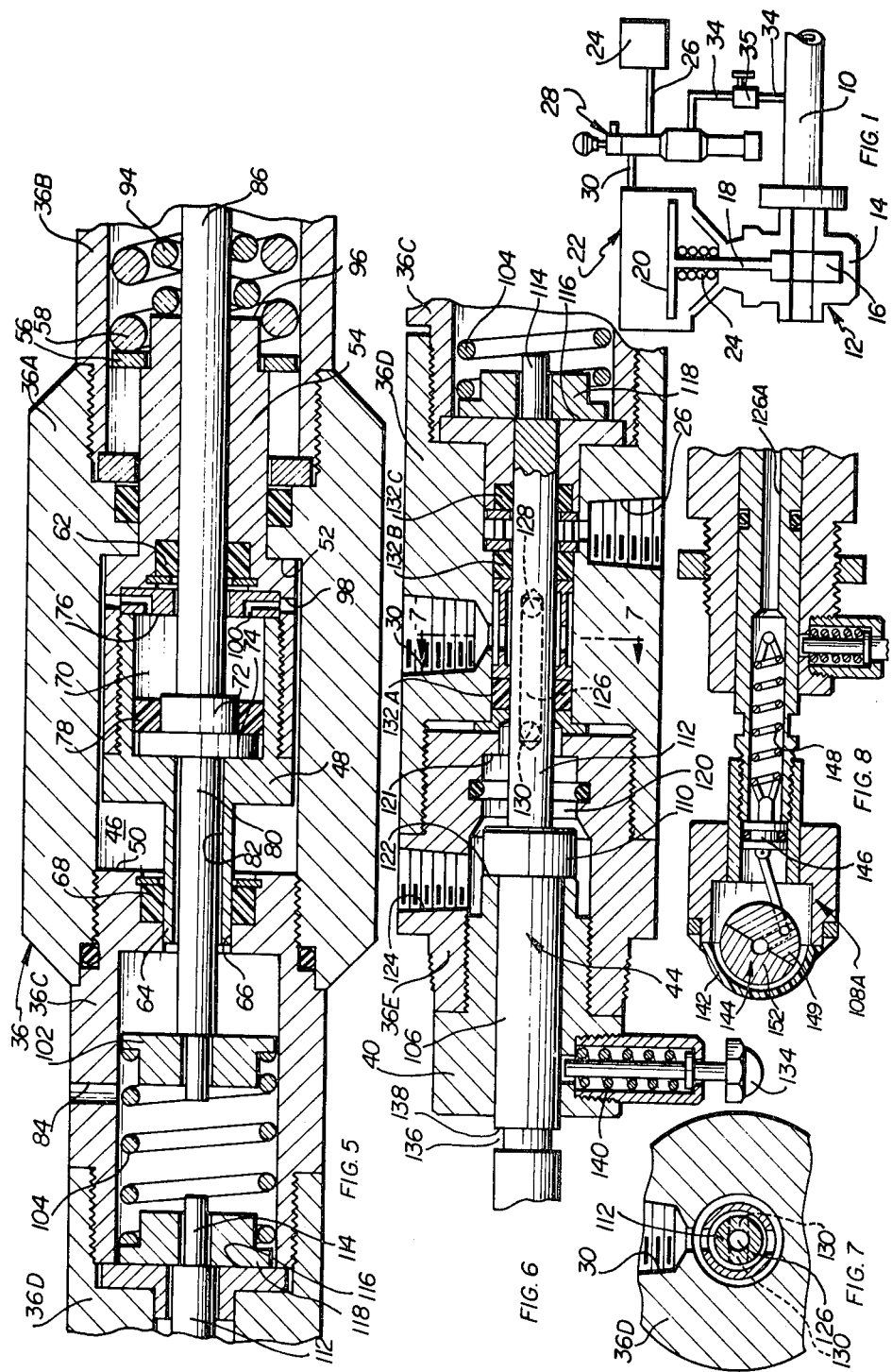

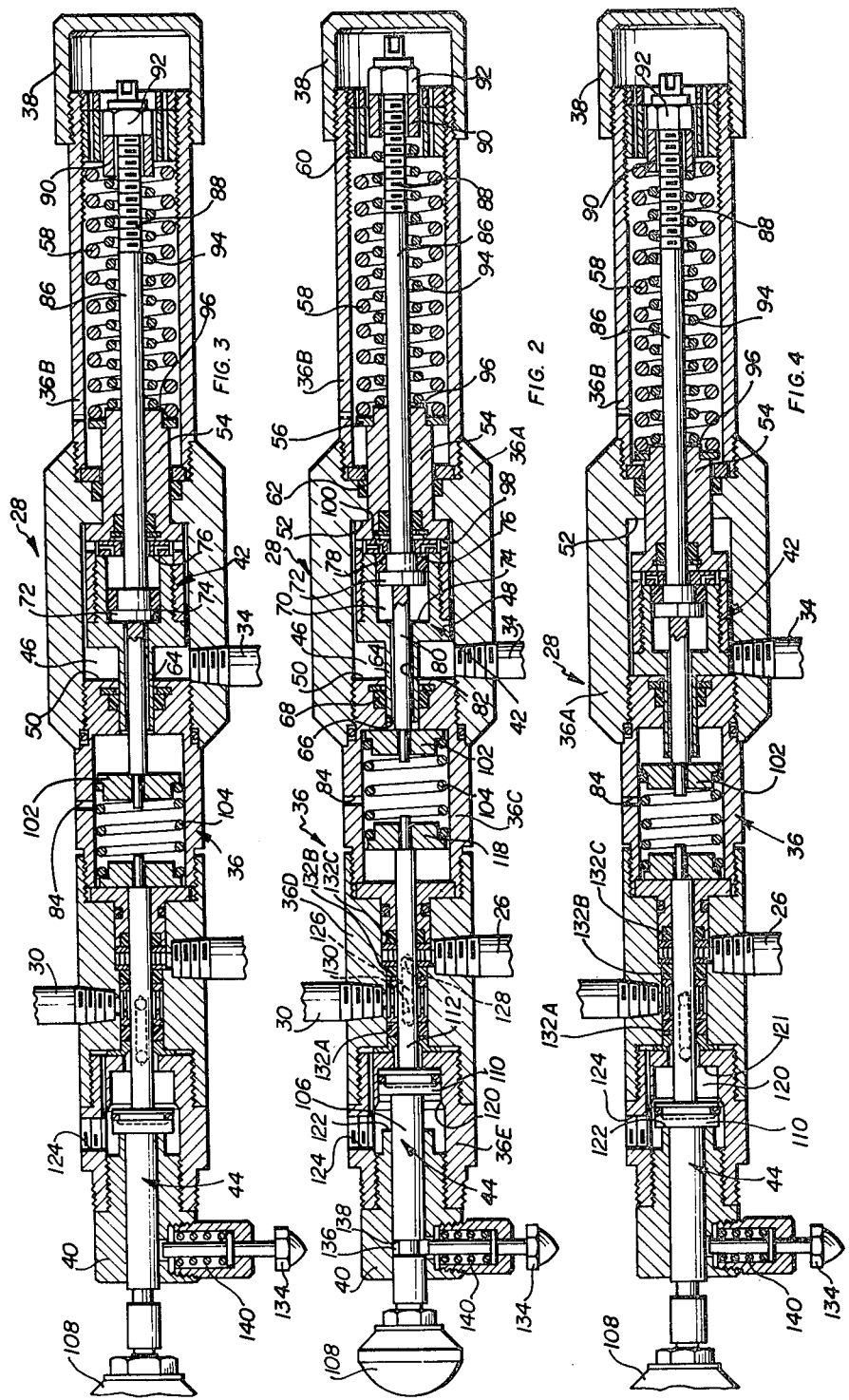

MANUALLY RESET CONTROL VALVE FOR A FLUID ACTUATOR

BACKGROUND OF THE INVENTION

Heretofore, in a safety system for closing a gate valve in a main flowline when the pressure in the flowline is outside a predetermined range, such as shown in U.S. Pat. No. 3,943,974 dated Mar. 16, 1976, a separate manual control valve has been utilized for resetting the pressure system after the fluid actuator for the gate valve has been vented to atmosphere. The manual control valve for resetting the fluid supply is gripped manually and moved to a position against a spring bias to supply fluid to the actuator for reopening the gate valve. Upon a build up of pilot line pressure in the high-low pressure sensors to the desired pressure range, a releasable detent holding the valve against the spring bias is released for placing the system in normal operating position.

A combined high-low pressure sensor has been provided heretofore with an automatic reset mechanism as shown in U.S. Pat. No. 4,116,215 dated Sept. 26, 1978. The shut-off valve is closed when the main flowline pressure is outside the predetermined operating range, and upon return of the flowline pressure to the normal or predetermined range, the shut-off valve is opened automatically without any manual reset mechanism.

DESCRIPTION OF PRESENT INVENTION

The present invention is directed to a single control valve having a high pressure sensor, a low pressure sensor, and a control valve for manually resetting the safety system after the valve actuator has been bled and the shut-in valve closed. Thus, a single device eliminates the necessity of having separate elements which must be connected by separate lines and results in a costly hook-up arrangement.

The integral control valve includes two separate valve mechanisms mounted in the bore of an elongate housing and connected to each other through a lost motion connection. One valve mechanism is a pressure sensing mechanism having valving to sense the fluid pressure in the main flowline and responsive to high and low pressure springs to actuate the valving at predetermined high and low fluid pressures in the main flowline. The other valve mechanism controls the flow of fluid to the actuator and is responsive to the actuation of the pressure sensing valve mechanism to vent the actuator for shutting-in a gate valve in the main flowline. The control fluid valve mechanism may be manually reset after the actuator has been bled to permit the actuator to be supplied again with fluid for opening the shut-in valve. The hand operated reset mechanism may be actuated independent of the sensing valve mechanism to permit a fluid flow to the actuator before the sensing valve mechanism is returned to operating position upon a predetermined operating pressure range being reached in the flowline. This is accomplished by a lost motion connection between the sensing valving and the control fluid valving comprising a coiled spring to permit axial movement of the control fluid valve relative to the sensing valving upon resetting. Thus, the manual reset mechanism does not have to be applied against the spring mechanism of the sensing valve means which is particularly important when high fluid pressures, such as 10,000 psi, are being sensed.

Inlet, outlet, and bleed ports communicate with the control fluid valve mechanism and the bleed port is in fluid communication with the actuator upon movement of the control fluid valving to unseated position. The control fluid valve mechanism includes a piston mounted in a cylinder and a rod extending from the piston secured to a spring retainer in opposed spaced relation to a spring retainer secured to the sensing valve mechanism. A spring between the opposed spring retainers provides the lost motion connection between the control fluid valving and the pressure sensing valving. A releasable detent is utilized with the control fluid valving to hold the piston in a seated position to permit fluid to flow to the actuator until the fluid pressure in the main flowline reaches a predetermined level at which the pressure sensing mechanism is reset and the detent is released. If desired, a visual indicator may be incorporated in the manual knob to indicate the position of the shut-in valve as illustrated in one (1) embodiment of the invention.

BRIEF DESCRIPTION OF THE DRAWINGS

FIG. 1 is a diagrammatic view showing the system in which the present invention is employed with a fluid actuator and a shut-in gate valve controlled by the system;

FIG. 2 is a longitudinal sectional view of the control valve comprising the present invention with the control valve shown in a normal operating condition within a predetermined pressure range;

FIG. 3 is a longitudinal sectional view similar to FIG. 2 but showing the control valve after actuation by a predetermined high pressure in the flowline outside the predetermined operating range for which the control valve is set;

FIG. 4 is a longitudinal sectional view of the control valve shown in FIG. 2 with the control valve being shown in the position after actuation by a low pressure below the predetermined operating range with the actuator being bled to atmosphere;

FIG. 5 is an enlarged portion of FIG. 3 showing the sensing valve mechanism in enlarged detail;

FIG. 6 is an enlarged portion of FIG. 4 showing the control fluid valve mechanism for controlling the fluid flow to the actuator in a vent position;

FIG. 7 is an enlarged section taken generally along line 7—7 of FIG. 6; and

FIG. 8 is another embodiment of the present invention showing a visual indicator in the manual knob for the control fluid valve mechanism to indicate the position of the shut-in gate valve.

Referring now to the drawings for a better understanding of this invention, more particularly to FIG. 1, a main flowline indicated at 10 has a gate valve structure generally indicated at 12 thereon. Valve body 14 has a gate valve 16 mounted therein which is movable to a closed position relative to flowline 10 to shut in or close flowline 10. A stem 18 connected to gate valve 16 is secured to piston 20 in pneumatic actuator indicated generally at 22. A spring 24 continuously urges piston 20 to an upper position in which gate valve 16 is closed or shut-in.

A fluid reservoir indicated at 24 supplies fluid through line 26 to the control valve comprising the present invention indicated generally at 28, and line 30 to actuator 22 for maintaining piston 20 in its lower position as shown in FIG. 1 with gate valve 16 in open position. Control valve 28 senses the fluid pressure in main flowline 10 through line 34 and on/off valve shown at 35 controls the fluid through sensing line 34 to control valve 28.

Control valve 28 includes an integral elongated housing generally designated at 36 which is comprised of several housing sections threaded to each other including a center section 36A, an end spring section 36B, and connecting sections 36C, 36D, and 36E. An end cap 38 is threaded on the end of spring section 36B, and an end plug 40 is threaded within connecting section 36E. Housing 36 is generally separated into two major portions, one portion including center section 36A and end section 36B which house a pressure sensing mechanism generally indicated at 42 for sensing the fluid pressure in main flowline 10; and the other portion including connecting sections 36C, 36D, and 36E which house the control fluid valve mechanism indicated generally at 44 for controlling the flow of fluid to actuator 22.

Referring first to pressure sensing mechanism 42, center section 36A provides a low pressure chamber 46 receiving a low pressure piston 48 mounted for movement in chamber 46 between ends 50 and 52. A reduced diameter outer extension 54 of piston 48 carries a spring seat 56 on which a low pressure spring 58 is seated. Low pressure spring 58 is compressed between seat 56 and an outer spring seat 60 threaded within end spring section 36B. Outer spring seat 60 may be adjusted to adjust the spring pressure on low pressure spring 58. Low pressure spring 58 continuously biases piston 48 towards a seated position against seat 50. A soft annular seal 62 seals about extension 54. A small diameter inner extension 64 fits within an annular bore 66 of connecting section 36C and an annular seal 68 seals around the periphery of extension 64.

Piston 48 forms a high pressure chamber at 70 having a high pressure piston 72 mounted therein for reciprocal movement between ends 74 and 76 of chamber 70. An annular seal 78 carried by high pressure piston 72 forms a fluid-tight relation with the adjacent wall of high pressure chamber 70. An inner piston rod extension 80 is received within a bore 82 in extension 64. The diameter of bore 82 is substantially greater than the diameter of piston rod extension 80 so that an annular fluid passage is provided between extension 80 and bore 82 so that fluid pressure from high pressure chamber 70 may be vented to atmosphere through this passage and outwardly through vent 84 in body connection 36C as illustrated particularly in FIG. 3. An outer piston rod extension 86 has a threaded end 88 on which a spring follower 90 is mounted. A nut 92 is threaded on end 88 to secure follower 90 thereon. A high pressure spring 94 is biased between follower 90 and 96 of extension 54 to urge continuously piston 72 to the position shown in FIG. 2 in which piston 72 is seated against end 76 of high pressure chamber 70. Fluid in chamber 46 is in communication with piston 72 through the spacing between the outer circumference of piston 48 and the inner wall of chamber 46, thence through fluid passageways 98 and 100 to the rear face of high pressure piston 72.

In operation, when a predetermined high pressure is reached in flowline 34 above the desired range, high pressure fluid is communicated through chamber 46 and fluid passageways 98 and 100 to piston 72 to urge high pressure piston 72 to the position of FIG. 3 in which the fluid in high pressure chamber 70 is vented about the outer circumference of inner piston rod extension 80 to atmosphere through vent 84. A spring follower 102 is secured to the end of piston rod extension 80 against the bias of spring 104. High pressure spring 94 is compressed between follower 90 and end 96 upon the movement of piston 72 relative to piston 48. It is noted that low pressure piston 48 does not move during movement of piston 72 upon actuation from a high pressure condition as shown in FIGS. 3 and 5.

In operation, when a predetermined low pressure is reached in flowline 34, the fluid pressure in low pressure chamber 46 is reduced and low pressure spring 58 urges low pressure piston 48 into seated position against end 50 of low pressure chamber 46. Movement of low pressure piston 48 from the position shown in FIG. 2 simultaneously moves high pressure piston 72 and any fluid in chamber 46 may be communicated through line 34 since the pressure in line 34 is at a low level below the predetermined range.

The structure thus defined is directed to sensing valve mechanism 42. Valve mechanism 44 for controlling the flow of fluid to actuator 22 is responsive to the actuation of sensing valve mechanism 42 at predetermined high and low pressures. Valve mechanism 44, as shown particularly in FIG. 6, includes an elongate slide valve 106 mounted within a central bore extending through sections 36C, 36D, and 36E, and end plug 40. A knob 108 is secured to an end of slide valve 106 and may be manually gripped for movement of slide valve 106. Slide valve 106 has an integral piston 110 intermediate its length and a reduced diameter inner end portion 112 having a small diameter end 114 which defines a shoulder 116 on which a spring follower 118 is seated. Spring 104 is seated and normally biased between follower 102 and follower 118. Piston 110 is mounted within a piston chamber 120 in end housing section 36E for movement between a seated position against end or shoulder 121 of chamber 120 in which position slide valve is in normal operating position, and a seated position shown in FIG. 6 against end or shoulder 122 in which position slide valve 106 is in a vent position. A vent port is provided at 124 in end section 36E.

Slide valve 106 has an axial bore 126 for a portion of its length adjacent inlet port 26 and outlet port 30. Cross ports 128 in valve 106 provide fluid passages from inlet 26 to bore 126, and cross ports 130 provide fluid communication with outlet port 30 and axial bore 126. Soft elastomeric annular seal rings 132A, 132B, and 132C are mounted about end portion 112 for sealing ports 128 and 130. As shown in FIG. 2, fluid from inlet 26 enters ports 128 and thence through ports 130 to outlet line 30 to the actuator for supplying fluid to the actuator. In the position of FIGS. 3 and 6, ports 128 are in fluid communication with outlet line 30 and ports 130 which have passed seal 132A are in fluid communication with vent 124 thereby to vent or bleed the actuator for shutting in gate valve 16. Annular seal 132B blocks fluid communication between ports 128 and inlet line 26 in the bleed position. In the normal operating position of FIG. 2, seal 132A blocks fluid communication between outlet port 130 and vent 124.

To reset valve mechanism 44 from the bleed position shown in FIGS. 3, 4, and 6 after the actuator has been vented and before sensing valve mechanism 42 has returned to its operating position, a releasable detent 134 is provided having an inner end which is adapted to fit within an annular groove 136 defining a lower shoulder 138. A spring 140 continuously urges detent 134 outwardly. For resetting valve mechanism 44, knob 108 is gripped and slide valve 106 pushed inwardly against the bias of spring 104. Then detent 134 is pushed within groove 136 against the bias of spring 140. Spring 104 urges shoulder 138 into engagement with the end of detent 134 to hold detent 134 by friction within the groove until follower 102 reseats itself after sensing valve mechanism 42 is reset to balance spring 104 so that spring 140 moves detent 134 outwardly from engagement with slide valve 106. When this occurs, valve mechanism 44 is operable with fluid being supplied to the actuator through line 30 from supply line 26.

In operation, from the position of FIG. 2 in which the control valve 28 is shown in a normal service position in the operating range which has been predetermined, upon a predetermined high pressure reached in sensing line 34, the high pressure fluid acting about the outer circumference of low pressure piston 48 and through ports 98 and 100 urges piston 72 to the position shown in FIG. 3 with the high pressure piston 72 seated against end 74 and high pressure spring 94 compressed. The movement of high pressure piston 72 as shown in FIG. 3 moves spring follower 102 to the left viewing FIG. 3, and acting through spring 104 moves spring follower 118 to a seated position thereby effecting movement of slide valve 106 to the position shown in FIG. 3 with piston 110 seated against end 122. In this position actuator 22 is vented through line 30, cross ports 128 and 130, piston chamber 120, and vent 124 thereby to bleed actuator 22 and shut-in gate valve 16.

In operation, from the normal operating position of FIG. 2, when a predetermined low pressure is reached, low pressure piston 48 moves under the influence of low pressure spring 58 to the left as shown in FIG. 4 and seats against end 50, and spring follower 102 is unseated as shown in FIG. 4. Movement of spring follower 102 effects movement of spring follower 118 to the seated position as shown in FIG. 4 through spring 104 thereby moving piston 110 to its seated position against seat 122. In this position, actuator 22 is vented to atmosphere through cross ports 128, 130, chamber 120, and vent 124.

When it is desired to place control valve 28 in service after the actuator has been bled either from a low fluid pressure or a high fluid pressure, knob 108 is gripped and slide valve 106 is pushed inwardly against the bias of spring 104. It is pointed out that valve mechanism 44 may be moved manually to supply fluid again to actuator 22 without a corresponding movement of sensing valve mechanism 42 since slide valve 106 may be pushed in and spring 104 compressed without the corresponding movement of follower 102. Thus, even though a very high pressure may still be exerted against sensing valve mechanism 42 from a high pressure condition in flowline 10, it is possible for a workman or the like to easily depress control valve mechanism 44 inwardly for supplying fluid again to actuator 22 as might be necessary under certain conditions of operation. This eliminates the difficulty involved in the possible depression of slide valve 106 against a high pressure spring. Detent 134 is depressed inwardly and holds slide valve 106 in a supply position until flowline pressure in flowline 10 reaches the predetermined operating range at which time sensing valve mechanism 42 will reset itself automatically from the fluid pressure. When spring follower 102 is seated, detent 134 is released by spring 140. The spring force of spring 140 is selected so that it will urge detent 134 outwardly when follower 102 is seated.

An embodiment is shown in FIG. 8 in which a visual indicator is mounted in knob 108 to provide a visual indication of the pressure condition of actuator 22 to indicate the position of gate valve 16. Knob 108A has a transparent cover 142 and a bi-colored indicator element 144 is mounted for rotative movement therein. Longitudinal bore 126A extends upwardly from and is a continuation of the axial bore shown in the embodiment of FIGS. 2-4 and fluid pressure from inlet 26 is communicated to piston 146 to urge piston 146 against tension spring 148 to a position in which a green colored element 149 is shown. When the fluid pressure in actuator 22 is exhausted through vent 124, the pressure in bore 126A is likewise exhausted and tension spring 148 moves piston 146 to the position shown in FIG. 8 in which the other colored element 152 is viewed through cover 142. Element 152 may be a red color to indicate the venting of actuator 22 and the closed position of gate valve 16. It is apparent that various other types of indicator elements could be employed with the knob 108A. For further details of the indicator mechanism, reference is made to U.S. Pat. No. 4,137,942 dated Feb. 6, 1979.

While the present invention has been illustrated for use with a shut-in gate valve for a main flowline, it is apparent that the control valve may be utilized for other purposes, such as, for example, a downhole safety valve.

What is claimed is:

1. A single control valve to control the supply of fluid from a pressurized source to a fluid actuator for a shut-off valve in a main flowline in response to changes in the flowline pressure monitored by the control valve, said control valve having in combination:

an elongate valve housing having a central bore therein and four ports communicating with the bore, namely, an inlet port for connection to a pressurized fluid source, an outlet port for connection to the fluid actuator, a vent port for exhausting to atmosphere, and a sensing port for connection to the main flowline for sensing the pressure directly from the main flowline;

a sensing valve mechanism mounted within the bore adjacent said sensing port actuated by predetermined high and low fluid pressures in the main flowline outside the predetermined operating range;

a control fluid valve mechanism mounted within the bore longitudinally of the sensing valve mechanism and adjacent the inlet, outlet and vent ports, said control fluid valve mechanism having a slide valve movable between supply and vent positions relative to the actuator, said slide valve being responsive to the actuation of said sensing valve mechanism at said predetermined high and low fluid pressures for movement from the supply position to the vent position of the actuator;

a manual reset for the control fluid valve mechanism for movement manually of the slide valve from the vent position to the supply position of the actuator; and a lost motion connection between said sensing valve mechanism and said control fluid valve mechanism to permit a manual movement of said slide valve from said vent position to said supply position relative to said sensing valve mechanism after actuation of the sensing valve mechanism at said predetermined high and low fluid pressures and without substantially displacing said sensing valve mechanism from its actuated condition.

2. The control valve as set forth in claim 1, wherein a lost motion connection operatively connects said sensing valve mechanism to said control fluid valve mechanism and effects movement of said slide valve to said vent position upon actuation of the sensing valve mechanism at said predetermined high and low fluid pressures.

3. The control valve set forth in claim 1, wherein said lost motion connection is a coiled spring and permits relative movement between said sensing valve mechanisms and said slide valve.

4. The control valve as set forth in claim 1, wherein a releasable detent holds the slide valve in the supply position of the actuator until the sensing valve mechanism is reset automatically by the fluid pressure in the main flowline returning to the predetermined fluid pressure operating range.

5. The control valve as set forth in claim 1, wherein said inlet, outlet, and vent ports are spaced longitudinally of the slide valve, and elastomeric O-rings extend about said slide valve between said ports to effect sealing therebetween, said slide valve having an axial bore and cross ports in fluid communication with said bore to permit fluid flow between said inlet and outlet ports in said supply position, and between said outlet and vent ports in said vent position.

6. A single control valve to control the supply of fluid from a pressurized source to a fluid actuator for a shut-off valve in a main flowline in response to changes in the flowline pressure monitored by the control valve, said control valve having in combination:
an elongate valve housing having a central bore therein and four ports communicating with the bore, namely, an inlet port for connection to a pressurized fluid source, an outlet port for connection to the fluid actuator, a vent port for exhausting to atmosphere, and a sensing port for connection to the main flowline;
a sensing valve mechanism mounted within the bore adjacent said sensing port having a fluid chamber to receive the sensed fluid, a valve member mounted in said fluid chamber responsive to the sensed fluid, a high pressure spring and a low pressure spring operatively connected to the valve member for actuation of the valve member at predetermined high and low fluid pressures in the sensed fluid;
a control fluid valve mechanism mounted within the bore axially of the sensing valve mechanism adjacent the inlet, outlet and vent ports, said control valve mechanism having an elongate slide valve movable between supply and vent positions of said actuator in which said outlet port is in respective fluid communication with said inlet and vent ports, said elongate slide valve extending outwardly of the housing and having a knob on the outer end thereof adapted to be gripped manually for moving the slide valve manually between supply and vent positions relative to said actuator; and means operatively connecting the valve member of said sensing valve mechanism to the slide valve of said control fluid valve mechanism to effect movement of the slide valve to the vent position of the actuator upon actuation of said valve member at said predetermined high and low fluid pressures, said means including a lost motion connection to permit movement of said slide valve to said supply position from said vent position relative to said valve member after actuation of the sensing valve mechanism at said predetermined high and low fluid pressures.

7. A control valve as set forth in claim 6, wherein said knob includes a visual indicator to indicate the vent and supply positions of the actuator.

8. The control valve as set forth in claim 6, wherein a releasable detent holds the slide valve in the supply position of the actuator until the sensing valve mechanism is reset automatically by the fluid pressure in the main flowline returning to the predetermined fluid pressure operating range.

9. In a system for controlling fluid flow in a main flowline having a shut-off valve therein, a fluid actuator connected to the shut-off valve to move the shut-off valve between open and closed positions, a pressurized fluid source, and a fluid line from the pressurized fluid source to the fluid actuator to supply fluid to the fluid actuator;
a single improved control valve mounted in the fluid line to control the supply of fluid to the fluid actuator from the fluid source in response to the fluid pressure in said main flowline;
said control valve comprising:
an elongate valve housing having a central bore therein and four ports communicating with said bore, namely, an inlet port connected to the pressurized fluid source, an outlet port connected to the fluid actuator, a vent port for exhausting to atmosphere, and a sensing port connected to the main flowline to sense directly the fluid pressure therein;
a sensing valve mechanism mounted within the bore adjacent said sensing port actuated by predetermined high and low fluid pressures in the main flowline outside the predetermined operating range;
a control fluid valve mechanism mounted within the bore longitudinally of the sensing valve mechanism and adjacent the inlet, outlet and vent ports, said control fluid valve mechanism having a slide valve movable between supply and vent positions relative to the actuator, said slide valve being responsive to the actuation of said sensing valve mechanism at said predetermined high and low fluid pressures for movement from the supply position to the vent position of the actuator;
a manual reset for the control fluid valve mechanism for movement manually of the slide valve from the vent position to the supply position of the actuator; and
a lost motion connection between said sensing valve mechanism and said control fluid valve mechanism to permit a manual movement of said slide valve from said vent position to said supply position relative to said sensing valve mechanism after actuation of the sensing valve mechanism at said predetermined high and low fluid pressures and without substantially displacing said sensing valve mechanism from its actuated condition.

10. A single control valve to control the supply of fluid from a pressurized fluid source to a fluid actuator for a valve in a main flowline in response to changes in the flowline pressure monitored by the control valve, said control valve having in combination:
an elongate valve housing having a central bore, an inlet port for connection to the pressurized fluid source, an outlet port for connection to the fluid actuator, a vent port for exhausting to atmosphere, and a sensing port for direct connection to the main flowline;

a sensing valve mechanism mounted within the bore adjacent said sensing port having a low pressure fluid chamber to receive the sensed fluid, a low pressure piston movably positioned within said low pressure fluid chamber for movement between a low pressure non-actuated position in which said low pressure fluid chamber can receive the sensed fluid and a low pressure actuated position in which said low pressure piston blocks the flow of the sensed fluid into said low pressure chamber, a low pressure spring connected to said low pressure piston for continuously urging said low pressure piston towards the low pressure actuated position, said low pressure piston having a high pressure chamber therein in fluid communication with said low pressure chamber and having opposite ends, a high pressure piston movably positioned within said high pressure chamber for movement between a high pressure non-actuated position in which said high pressure piston is seated against one end of said high pressure chamber and a high pressure actuated position in which said high pressure piston abuts other end of said high pressure chamber, a high pressure spring connected to said high pressure piston for continuously urging said high pressure piston towards the high pressure non-actuated position, said high pressure piston being operative with said low pressure piston so that when said low pressure piston moves to the low pressure actuated position said high pressure piston is carried along in its high pressure non-actuated position, and when said high pressure piston moves to the high pressure actuated position said low pressure piston remains stationary;

a control fluid valve mechanism mounted within said bore axially of said sensing valve mechanism adjacent said inlet, outlet, and vent ports, said control valve mechanism having an elongate slide valve movable between supply and vent positions relative to the fluid actuator in which said outlet port is in respective fluid communication with said inlet and vent ports, said elongate slide valve extending outwardly of said elongate valve housing and having manual gripping means on the outer end thereof for moving said slide valve manually between said supply and vent positions, said slide valve being connected to said high pressure piston and moving from said supply position to said vent position in response to the actuation of said high or low pressure pistons; and a lost motion connection between said sensing valve mechanism and said control fluid valve mechanism to permit a manual movement of said slide valve from said vent position to said supply position relative to said sensing valve mechanism after actuation of the sensing valve mechanism at said predetermined high and low fluid pressures and without substantially displacing said sensing valve mechanism from its actuated condition.

* * * * *